United States Patent
Baker et al.

(10) Patent No.: US 12,151,132 B2
(45) Date of Patent: Nov. 26, 2024

(54) FIRE SUPPRESSION FLUID CONTAINING A CARBOXYLATE SALT

(71) Applicant: Lubrizol Advanced Materials, Inc., Cleveland, OH (US)

(72) Inventors: Mark R. Baker, Greer, SC (US); David M. Pallister, Highland, MI (US); Mark Knurek, Broadview Hts., OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 97 days.

(21) Appl. No.: 17/284,501

(22) PCT Filed: Oct. 11, 2019

(86) PCT No.: PCT/US2019/055782
§ 371 (c)(1),
(2) Date: Apr. 12, 2021

(87) PCT Pub. No.: WO2020/077175
PCT Pub. Date: Apr. 16, 2020

(65) Prior Publication Data
US 2021/0370118 A1  Dec. 2, 2021

Related U.S. Application Data

(60) Provisional application No. 62/744,728, filed on Oct. 12, 2018.

(51) Int. Cl.
*A62D 1/00* (2006.01)
*C09K 5/20* (2006.01)

(52) U.S. Cl.
CPC .............. *A62D 1/0035* (2013.01); *C09K 5/20* (2013.01)

(58) Field of Classification Search
None
See application file for complete search history.

(56) References Cited

U.S. PATENT DOCUMENTS

| | | |
|---|---|---|
| 10,046,191 B1 | 8/2018 | Hernandez et al. |
| 2014/0138105 A1 | 5/2014 | Kuwatch et al. |
| 2016/0102233 A1 | 4/2016 | Chen et al. |
| 2018/0345061 A1 | 12/2018 | Hernandez et al. |

FOREIGN PATENT DOCUMENTS

| | | |
|---|---|---|
| GB | 2138837 A | 10/1984 |
| JP | 2015155520 A | 8/2015 |
| WO | 0147604 A1 | 7/2001 |
| WO | 2010008951 A1 | 1/2010 |
| WO | 2012/154768 | 11/2012 |

*Primary Examiner* — Tanisha Diggs
(74) *Attorney, Agent, or Firm* — Christopher P. Demas; Michael A. Miller

(57) ABSTRACT

An aqueous fire sprinkler fluid containing a $C_4$ or greater carboxylate salt for freezing point depression is described. The salts may be used in conjunction with glycols. The salts decrease the combustibility and give lower viscosity than higher glycol fluids, both benefitting fire sprinkler systems. These salt solutions are friendly to metal and CPVC pipes and are thus useful for fire sprinkler systems by not causing environmental stress cracking of the CPVC components and not being corrosive to the metal parts.

8 Claims, No Drawings

FIRE SUPPRESSION FLUID CONTAINING A CARBOXYLATE SALT

FIELD OF INVENTION

Fluids in a fire sprinkler system must remain fluid at low temperatures such as below 0° C. and preferably below −40° C. They also need to protect the fire sprinkler system over long term static conditions. As such they need to be compatible with and non-corrosive to the construction materials in a fire sprinkler system as well as providing the primary function to be able to suppress or extinguish fires. The fluids disclosed herein include a $C_4$ or greater carboxylate salts (e.g., sodium or potassium) which acts as an electrolyte to reduce the freezing point of the water used in the solution often in conjunction with a glycol. The selected salt(s) impart other desired properties disclosed herein as well.

BACKGROUND OF INVENTION

Solutions for fire sprinkler fluids are currently subject of UL 2901, which sets forth a number of performance standards the fluid must pass to become certified, including freeze point, electrical conductivity, corrosion rate and heat release, among others.

Ethylene glycol water solutions are commonly used for fire sprinkler fluids to due to the low corrosivity of the glycol and the low fire hazard associated with it. The glycol is used to depress the freezing point of the fluids. A problem with these solutions is their potential toxicity both to the environment and to food products or animals, and the possible contamination of potable water systems to which the fire sprinkler system may be connected. For lower toxicity, some systems use or have converted to propylene glycol as an alternative to ethylene glycol. Due to the higher carbon content, the aqueous solutions of propylene glycol need to be carefully balanced to avoid fire or explosion hazards associated with a fine mist of organic carbon-containing water exposed to a fire or ignition source.

Similarly, given the aqueous nature of these fire sprinkler fluids, the possibility of electrocution arises if the fluids are sprayed around electric current carrying devices, from electrical outlets to electric appliances to computers.

In addition, fire sprinkler fluids need to be compatible with the material of the piping through which they are pumped. For example, the fluids must be non-corrosive to iron pipe particularly, but also with non-ferrous metals, and non-degrading of plastic pipes.

With respect to plastic pipe in particular, such sprinkler fluids may be used with chlorinated polyvinylchloride (CPVC) pipe such as Blaze Master®. High concentrations of propylene glycol when exposed to CPVC pipe may contribute to environmental stress cracking. To mitigate this concern, glycerin (aka glycerol) has been employed. One problem with glycerin and to a lesser extent with any glycol is too high of viscosity of the aqueous fluids at low temperature. Low viscosity of the aqueous fluids at low temperature is optimal for fire sprinklers.

In summary the ideal fire sprinkler fluid maintains good fluidity at low temperature, is non-toxic, non-combustible, non-corrosive to metals and compatible with plastics, such as CPVC, and has low electrical conductivity.

U.S. Pat. No. 2,266,189 reveals antifreeze compositions which use potassium acetate or potassium formate solutions among others as replacements for glycol water solutions as heat transfer fluids. It further discloses the use of certain corrosion inhibitors and mentions the low viscosity of the salt solutions compared to glycol or glycerol solutions. U.S. Pat. Nos. 3,252,902; 4,756,839; 5,820,776; 5,945,025 and EP 0 376 963 B1 show carboxylate salts in fire extinguishing compositions, the last four in combination with carbonate or bicarbonate. U.S. Pat. No. 6,367,560 shows a potassium lactate solution in a sprinkler system for cold environments. U.S. Pat. No. 6,059,966 discloses a low-viscosity, aqueous coolant brine based on inhibited alkali metal acetates and/or formates having improved corrosion protection, wherein the coolant brines contain 0.2 to 5% by weight of alkali metal sulfites or pyrosulfites. U.S. Pat. No. 6,659,123 discloses maintaining a fire hydrant in cold weather using potassium formate, preferably at least 10% by weight in water. U.S. Pat. No. 6,983,614 assigned to Lubrizol Corp. taught potassium formate heat transfer fluids. Japan patent application publication JP2003135620 discloses potassium formate at various concentrations in water as antifreeze for fire sprinkler systems as a replacement for ethylene glycol. Small amounts of glycol are allowed for dissolving corrosion inhibitors, but the emphasis is on eliminating glycols in general to reduce the C.O.D and B.O.D. and the load to the environment. US Publication 2014/0138105 A1 discloses a fire suppression fluid containing a "low carbon number," meaning $C_1$-$C_3$, carboxylate salt. The publication is focused on potassium formate at levels of greater than 10 wt %.

It would be desirable to identify a fire suppression fluid having good low temperature fluidity and minimal tendency toward metal corrosion or degradation of CPVC, with suppressed or inhibited combustibility, low electrical conductivity and improved fluidity.

SUMMARY OF INVENTION

The current technology includes a fire suppression fluid including a $C_4$ or greater carboxylate salt at low concentrations that can provide a fluid with good low temperature fluidity and minimal tendency toward metal corrosion or degradation of CPVC, with suppressed or inhibited combustibility, low electrical conductivity and improved fluidity.

A freezing point depressed aqueous fluid for a fire sprinkler system having water (such as demineralized water), a $C_2$-$C_{18}$ alkylene glycol, and a $C_4$ or greater carboxylate.

Glycols suitable for the fluid include ethylene glycol or propylene glycol. Similarly, carboxylates suitable for the fluid include disodium adipate or disodium succinate.

The fluid can also include other components, such as a corrosion inhibitor, antioxidants, pH buffers, etc.

The fluid may be used, for example, in a fire sprinkler system made of chlorinated polyvinyl chloride ("CPVC") to prevent the sprinkler system from freezing.

DETAILED DESCRIPTION OF THE INVENTION

The freezing point depressed aqueous fluid for a fire sprinkler system may also be referred to as a fire sprinkler fluid or a fire suppression fluid. A sprinkler system containing such a fluid that may also contain piping or components made of CPVC will also be described. The fluids are designed to be compatible with CPVC, have low corrosivity to metals, particularly iron and steel, but also to nonferrous metals. At the same time the fluids do not freeze at low temperature and have acceptable low viscosity at low temperature, such as less than −10C and preferably remain fluid to less than −40C.

The freeze protection fluid described in this invention has the ability to be used in a water based, hydraulically calculated fire protection (sprinkler) system. In some embodiments the fluid additionally has one or more of the following desired properties:

1. Non-combustible when tested when exposed to fire in UL 2901 and in a full scale, UL 1626 based, room fire test for spray ignition using sprinklers.
2. Freezing point protection down to and below −40F (−40C) as per NFPA 13.7.6.2
3. Good low temperature viscosity characteristics, i.e. low viscosity at low temperatures.
4. No flash point as determined by ASTM D 56 (D 92, D93 . . . )
5. Inhibits the growth of microbiologically influenced corrosion (MIC) in metal based piping systems.
6. Does not induce environmental stress cracking (ESC) in CPVC materials as determined by ASTM F 2331
7. Is not considered toxic or a contaminant to potable water systems
8. Has low electrical conductivity.

The fire suppression fluids provided have a mixture of water, at least one $C_2$ to $C_{18}$ alkylene glycol, and a $C_4$ or greater carboxylic acid salt (also referred to as a carboxylate).

Preferably the water component is a demineralized water, which would reduce or eliminate the electrical conductivity of the water. Demineralization can be by any known method, such as, for example, by distillation, deionization, reverse osmosis, or filtration. Water may be present in the fire suppression fluid from about 30 to about 80 wt % based on the weight of the fire suppression fluid, or from about 35 to about 75 wt %, or even from about 35 to about 70 wt % or even 30 to 50 wt % or 35 to 45 wt %.

The $C_2$ to $C_{18}$ alkylene glycol can be a diol or triol. The alkylene components can be linear, branched, cyclic or aromatic. Examples of suitable $C_2$ to $C_{18}$ alkylene glycols include, for example, ethylene glycol, propylene glycol, butanediol, bisphenol, resorcinol, glycerin, 1,3-propanediol and the like. Other examples can include Sugar alcohols, sorbitol, mannitol, xylitol, erythritol, pentaerythritol, arabitol, inositol, and glycol ethers.

In an embodiment, the $C_2$ to $C_{18}$ alkylene glycol can be ethylene glycol. In a further embodiment, the $C_2$ to $C_{18}$ alkylene glycol can be propylene glycol. In some embodiments, the $C_2$ to $C_{18}$ alkylene glycol can be glycerin. Some embodiments of the $C_2$ to $C_{18}$ alkylene glycol can include a combination of glycols, such as propylene glycol and glycerin, or ethylene glycol and glycerin, or even propylene glycol and ethylene glycol. The $C_2$ to $C_{18}$ alkylene glycol can be present in the fire suppression fluid at from about 15 to 45 wt % based on the weight of the fire suppression fluid, or from about 20 to about 42 wt %, or from about 25 to about 40 wt %. Combinations of the $C_2$ to $C_{18}$ alkylene glycol can also be used, for example, a two part combination may be present in the above noted concentrations anywhere from a 70/30 to a 30/70 wt % split. Combinations of three or more $C_2$ to $C_{18}$ alkylene glycols may also be employed.

The fire suppression fluid also includes a $C_4$ or greater carboxylate. The $C_4$ or greater carboxylate may be a salt with, for example, Li, K, Mg, Ca, Na and hydrates and combinations thereof.

The $C_4$ to $C_{18}$ metal carboxylate can be a mono-, di- or tri-valent metal salt of a saturated $C_4$ to $C_{18}$ aliphatic carboxylate, an unsaturated $C_4$ to $C_{18}$ aliphatic carboxylate, a saturated $C_4$ to $C_{18}$ aliphatic carboxylate substituted with at least one OH group, or whose chain is interrupted by at least one oxygen atom (oxyacids), or a cyclic or bicyclic carboxylate. In some embodiments, the mono-, di- or tri-valent metal carboxylate can be a $C_4$ to $C_{18}$ metal carboxylate, or a $C_4$ to $C_{16}$ metal carboxylate, or even a $C_6$ to $C_{12}$ metal carboxylate.

The carboxylate in the $C_4$ to $C_{18}$ metal carboxylate can be a mono-carboxylate. Mono-carboxylates can include, for example, metal salts of lauric acid, or stearic acid, such as sodium laurate or sodium stearate. The carboxylate in the $C_4$ to $C_{18}$ metal carboxylate can also be a di-carboxylate. Examples of $C_4$ to $C_{18}$ metal carboxylates can include disodium sebacate, disodium dodecanedioate or disodium suberate, and combinations thereof. Other examples of $C_4$ to $C_{18}$ metal di-carboxylates that may be employed include disodium adipate, disodium succinate, disodium azelate, and disodium undecanedioate. The carboxylate in the $C_4$ to $C_{18}$ metal carboxylate can also be tri-carboxylate, such as, for example, metal salts of citric acid, such as tri-sodium citrate or tri-potassium citrate, or aconitic acid, such as tri-sodium or tri-potassium aconitic acid.

In some embodiments, the fluid may include a combination of two or more of the mono-carboxylates, di-carboxylates and tri-carboxylates.

Although $C_4$ or greater carboxylates are preferred, low carbon number (e.g., $C_2$-$C_3$) carboxylic acid salts may be employed alongside. Examples of low carbon number carboxylic acids include, for example, formic acid, acetic acid, propionic acid, glycolic acid, lactic acid, and the like. Potassium formate and sodium formate are examples of a low carbon number metal carboxylate that may be employed alongside the $C_4$ to $C_{18}$ metal carboxylates.

The $C_4$ or greater carboxylic acid salts may be present in the mixture at a sufficient amount to achieve the desired freezing point needed for the environment of the fire suppression. This is usually accomplished by determining the coldest temperature to which the fluid will be exposed and then forming a fluid that will remain unfrozen at a temperature at least 5° C. colder than the anticipated temperature.

In some instances, the $C_4$ or greater carboxylic acid salt may be present in the fire suppression fluid at from about 0.01 to about 15 wt % based on the weight of the fire suppression fluid, or from about 0.05 to about 12 wt %, or even from about 0.1 to about 10 wt %. In some instances, the $C_4$ or greater carboxylic acid salt may be present in the fire suppression fluid at from greater than about 2 to about 15 wt % based on the weight of the fire suppression fluid, or from about 2.1 or 2.2 to about 14 wt %, or even from about 2.5 to about 12 wt %, and even 2.75 or 3 to 10 wt %. In some instances the $C_4$ or greater carboxylic acid salt may be present in an amount of from about 3 to about 9 wt % or 3 to 8 wt %.

The fire suppression fluid can also optionally further include an antioxidant. Any antioxidant that is soluble in water/glycol systems may be employed. Some examples include butylated hydroxytoluene ("BHT"), butylated hydroxy anisole ("BHA"), THBP, TBHQ, 4-hydroxyphenyl-propionic acid, propyl gallate, 3,3 thiodipropionic acid, N-phenyl-alpha-naphthyl amine (PANA), octylated/butylated diphenylamine, high molecular weight phenolic antioxidants, hindered bis-phenolic antioxidant, di-alpha-tocopherol, di-tertiary butyl phenol and the like, and combinations thereof. The antioxidants may be present in the composition from 0.01% to 6.0% or from 0.02%, 0.03%, 0.05%, 0.1% to 6%, 4%, 2%, 1% or even 0.5%.

The fluid can be buffered with various buffers to control the pH variation should the sprinkler fluid be further diluted or contaminated with an acid or base. The buffer can comprise various alkali metal phosphates, borates and carbonates and/or glycines. These include combinations such as sodium phosphate, disodium phosphate, and trisodium phosphate, various borates, glycine, and combinations of sodium bicarbonate or potassium bicarbonate, sodium carbonate or potassium carbonate. The counter ions e.g. sodium, potassium, lithium, calcium, and magnesium are not critical to the buffering and due to the presence of excess potassium may exchange with other cations.

Selected corrosion inhibitors which exhibit good solubility in high salt aqueous solutions are used in the $C_4$ or greater carboxylate salt based fluids. These corrosion inhibitors may be present in concentrations up to 4 weight percent and desirably above 0.001 weight percent or from about 0.1 weight percent up to 2 weight percent based on the weight of the fluid. Corrosion inhibitors include triazole inhibitors such as benzotriazole (preferred in combination), substituted benzotriazoles, tolyl triazole and its derivatives (e.g. Irgamet® 42), benzimidazole, a diazole such as dimercaptothiadiazole (preferred in combination); water-soluble aryl sulfonates, citric acid, sulfamic acid, inorganic nitrites, and mixtures of $C_5$ to $C_8$ monocarboxylic acid or alkali-, ammonium- or amino-salts of said acid, a $C_2$-$C_8$ dicarboxylic acid or alkali-, ammonium- or amino-salts of said acid (Irgacor® L 190). Vapor phase corrosion inhibitors can also be added to the fluid and would reduce corrosion on surfaces that are not always in contact with the fluid. A preferred vapor phase corrosion inhibitor would be tertiary amine, $R_3N$, where R contains 1 to 4 carbon atoms. Vapor phase corrosion inhibitors are generally desirable at concentrations up to 0.3 weight percent based on the weight of the fluid. Borates e.g. borax (optionally used as buffers) may also function as a corrosion inhibitor. Higher carboxylic acid such as 2-ethyl-hexanoic acid or dicarboxylic acids such as sebacic acid or their salts may act as corrosion inhibitors. Even some of the low carbon number carboxylic acid such a lactic or propionic acid, or low carbon number diacids such as tartaric acid or citric acid or their salts may act as corrosion inhibitors.

Biocides are also desirable components in the fire sprinkler fluid. The biocides prevent the growth of various plant and animal life that may be introduced from the water supply or which have been growing in the prior fluid. Desirably the biocide is present at a concentration of less than 0.5 weight percent and more desirably less than 0.3 weight percent. Preferred biocides are various copper salts that can effectively control most plant and animal growth at less than 0.025 weight percent concentrations and more desirably less than 0.005 weight percent based on the weight of the fluid. The copper cation seems to be primarily associated with the biocide activity. With these copper salts the actual copper concentration is less than 100 ppm and more desirably less than 25 ppm. Suitable copper salts include copper acetate, copper sulfate, and copper citrate. The copper salts may also assist in preventing certain types of corrosion. Glutaraldehyde can also be added to the fluid as a biocide. Borates also inhibit growth of bacteria, etc.

Desirably both the corrosion inhibitors and the biocide are soluble at levels higher than that necessary for many applications so that the entire fire sprinkler fluid can be prepared as a concentrate. This provides an opportunity to deliver the effective concentrations of corrosion inhibitor and/or biocide upon dilution with water at the site of use to form a fire sprinkler fluid.

One can also include metal ion scavengers (chelating agents) such as ethylenediaminetetraacetic acid or its salt (EDTA). Desirable concentrations of chelating agents are up to 2 or 6 weight percent and more desirably from about 0.2 to about 6 weight percent based on the weight of the fluid.

While the fire suppression fluid will be compatible with CPVC components, such as CPVC pipe and fittings, its use is not limited thereto. The fire suppression fluid may indeed be employed in any fire suppression piping system, including systems containing metal components, including, for example, iron, copper, steel, such as stainless steel and galvanized steel, brass and combinations thereof. The fluid may also be employed in other types of plastic piping systems, including, for example, polypropylene reinforced ("PPR") systems, polypropylene random copolymer systems, polyethylene raised temperature ("PE-RT") systems, crosslinked polyethylene ("PEX") systems, systems with nitrile rubbers, such as nitrile butadiene rubber ("NBR") and the like, EPDM containing systems, systems with elastomeric materials, styrene butadiene rubber ("SBR"), and combinations thereof. The fluid may also be employed in systems containing both metal and plastic components.

Various combinations of formulations of the fire suppression fluid were prepared in water and tested for performance according to the performance standards in UL 2901 for freeze point (ASTM D1177), electrical conductivity (ASTM D1125), corrosion rate (NFPA 18A), and heat release (section 17.5.1 of UL 2901).

The formulations tested are set forth below, where "PG" is polyethylene glycol, "Gly" is glycerin, "EG" is ethylene glycol, "Di Adipate" is disodium adipate, "Di Succ" is disodium succinate, and "K+Formate" is potassium formate.

Comparative formulations using just an alkylene glycol.

| Sample | PG (wt. %) | Gly (wt. %) | EG (wt. %) | Freezing Point (° C.) | pH | Conductivity (milli-Siemens/cm ± 0.5 mS/cm) |
|---|---|---|---|---|---|---|
| 1 | 31 | | | −13.7 | 7 | 1.1 |
| 2 | 44 | | | −26.9 | 8 | 1.1 |
| 3 | 49 | | | −31.7 | 8 | 1.1 |
| 4 | 54 | | | −44.3 | 7 | 0.9 |
| 5 | | 31 | | −11.9 | 7 | 3.2 |
| 6 | | 44 | | −18.7 | 7 | 2.2 |
| 7 | | 49 | | −22.8 | 7 | 2 |
| 8 | | 54 | | −27.4 | 7 | 1.7 |
| 9 | | | 44 | −28.2 | 7 | 5.8 |
| 10 | | | 51 | −34 | 7 | 5.5 |
| 11 | 30 | 30 | | −43.6 | 7 | 0.9 |
| 12 | 22 | 22 | | −23.1 | 6 | 1.5 |
| 13 | 26 | 26 | | −28.9 | 5 | 1.5 |

Comparative formulations using just a carboxylate.

| Sample | Di Adipate (wt. %) | Di Succ (wt. %) | K+ Formate | Freezing Point (° C.) | pH | Conductivity (milli-Siemens/cm ± 0.5 mS/cm) |
|---|---|---|---|---|---|---|
| 14 | 3 | | | −1.7 | 8 | 19 |
| 15 | 6 | | | −5 | 8 | 32.4 |
| 16 | 12 | | | −6.2 | 7 | 50.4 |
| 17 | | 3 | | −3.1 | 7 | 23.7 |
| 18 | | 6 | | −4.3 | 7 | 40.2 |
| 19 | | 12 | | −6.5 | 7 | 62.7 |
| 20 | | | 3 | −3.5 | 7 | 34.7 |
| 21 | | | 6 | −4.8 | 7 | 63.7 |
| 22 | | | 12 | −7.1 | 7 | 114.5 |
| 23 | 4 | 4 | 4 | −5 | 8 | 73.9 |

Formulations using a succinate based product

| Sample | PG | Gly (wt. %) | Di Succ | Freezing Point (° C.) | pH | Conductivity (milli-Siemens/cm ± 0.5 mS/cm) |
|---|---|---|---|---|---|---|
| 24 | 22 | 22 | 3 | −27.9 | 7.5 | 6 |
| 25 | 22 | 22 | 6 | −33.3 | 7.6 | 9.6 |
| 26 | 24.5 | 24.5 | 6 | −41.5 | 8.7 | 7.5 |
| 27 | 25.5 | 25.5 | 6 | −38.6 | 7.7 | 6.6 |
| 28 | 25.5 | 25.5 | 12 | −47.1 | 7.4 | 9.5 |

Formulations using an adipate based product.

| Sample | PG | Gly | EG (wt. %) | Di Adipate | Freezing Point (° C.) | pH | Conductivity (milli-Siemens/cm ± 0.5 mS/cm) |
|---|---|---|---|---|---|---|---|
| 29 | 31 | | | 1.9 | −16.2 | 7.9 | 5.1 |
| 30 | | 31 | | 1.9 | −12.3 | 7.6 | 6.2 |
| 31 | | 31 | | 3 | −10.5 | 9 | 8.9 |
| 32 | | 31 | | 6 | −13.8 | 7.4 | 14.9 |
| 33 | | 22 | 22 | 3 | −26.9 | 8 | 6.4 |
| 34 | | 25.5 | 25.5 | 6 | −31 | 7.2 | 8.8 |
| 35 | 22 | 22 | | 3 | −29 | 7.9 | 4.9 |
| 36 | 22 | 22 | | 6 | −27.5 | 7.3 | 8.6 |
| 37 | 25 | 25 | | 6 | −43.3 | 7.5 | 5.7 |
| 38 | 25.5 | 25.5 | | 6 | −42.4 | 7.2 | 6.3 |
| 39 | 25.5 | 25.5 | | 12 | −45.2 | 7.1 | 7.1 |
| 40 | 27 | 27 | | 6 | −49 | | |
| 41 | 25.5 | 25.5 | | 9 | −48.8 | 7.2 | 6.7 |
| 42 | 24.5 | 24.5 | | 9 | −44.8 | 7.2 | 7.4 |

Formulations using a formate based product.

| Sample | PG | Gly (wt. %) | K+ Formate | Freezing Point (° C.) | pH | Conductivity (milli-Siemens/cm ± 0.5 mS/cm) |
|---|---|---|---|---|---|---|
| 43 | 22 | 22 | 3 | −25.8 | 7 | 10.3 |
| 44 | 22 | 22 | 6 | −31.3 | 7.2 | 18.4 |
| 45 | 25.5 | 25.5 | 6 | −39.3 | 7.3 | 13.3 |
| 46 | 25.5 | 25.5 | 12 | −47.3 | 7.6 | 20.8 |

A series of microscale combustion calorimeter ("MCC") tests were also conducted in accordance with ASTM D7309-13 on the formulations show in the Table below. The freezing point of the samples were also tested according to ASTM D6660.

| Ingredient | Samples (wt. %) | | | | | | | | |
|---|---|---|---|---|---|---|---|---|---|
| | 47 | 48 | 49 | 50 | 51 | 52 | 53 | 54 | 55 |
| Water | 34 | 34 | 34 | 53 | 37 | 53 | 37 | 53 | 37 |
| Propylene Glycol | 54 | | | 22 | 25.5 | 22 | 25.5 | 22 | 25.5 |
| Glycerin | | 54 | 54 | 22 | 25.5 | 22 | 25.5 | 22 | 25.5 |
| Disodium adipate | | 12 | | 3 | 12 | | | | |
| Disodium succinate | | | | | | | | 3 | 12 |
| Potassium formate | 12 | | 12 | | | 3 | 12 | | |

Each of samples 47 to 55 were tested three times. The average of the three MCC test results for each sample is provided below, along with the freeze point.

| Sample | D6660 Freeze Point (° C.) | Heat Release Capacity (J/gK) | Peak Heat Release Temp (° C.) | Peak Specific Heat Release Rate (W/g) | Pyrolysis Residue (g/g) | Specific Heat of Combustion (J/g) |
|---|---|---|---|---|---|---|
| 47 | −56.0 | 228 | 181 | 225 | 0.1704 | 13.9 |
| 48 | −48.3 | 161 | 292 | 161 | 0.0756 | 10.6 |
| 49 | −51.6 | 95 | 261 | 97 | 0.1327 | 9.7 |
| 50 | −25.1 | 99 | 169 | 95 | 0.0092 | 8.7 |
| 51 | −52.0 | 91 | 207 | 90 | 0.0709 | 11.7 |
| 52 | −25.6 | 117 | 176 | 114 | 0.0364 | 8.5 |
| 53 | −50.9 | 109 | 183 | 104 | 0.1072 | 10.6 |
| 54 | −25.4 | 99 | 179 | 94 | 0.0227 | 8.5 |
| 55 | −53.4 | 97 | 213 | 94 | 0.0852 | 11.2 |

Each of samples 47 to 55, along with several commercially available anti-freeze solutions, were also tested for corrosion in accordance with ASTM G71, with the following parameters. Each test run used 250 mL of solution in a 600 mL beaker, covered by parafilm to prevent evaporation, with the metal coupons dipped 1 inch into the solution using the following metal coupon combinations: 1008 carbon steel/half hard brass and 1008 carbon steel/copper. The coupon dimensions were as follows: 1008 carbon steel 6" X 1" X 0.032", half hard brass 5-6" X 1.5" X 0.125", and copper 6" X 2" X 0.032". The metal coupons were separated by a plastic T-shaped holder, held by a plastic clamp and electrically coupled via the test solution. The test was run for 7 days with voltage readings recorded twice a day. The final reported values were the voltage in millivolts after 7 days. The results of the testing can be seen in the table below.

| Sample | Brass/Steel Final voltage (mV) | Copper/Steel Final voltage (mV) |
|---|---|---|
| 47 | 145.3 | 101.1 |
| 48 | 193.8 | 66.4 |
| 49 | 113.0 | 89.3 |
| 50 | 47.3 | 86.7 |
| 51 | 140.5 | 75.9 |
| 52 | 115 | 107.8 |
| 53 | 43.8 | 126.1 |
| 54 | 54.6 | 83.8 |
| 55 | 159.3 | 77.0 |
| Water | 684 | 708 |
| Noburst ™ 100* | 162.3 | 106.0 |
| Firefighter ™ gl48** | 159.0 | 121.4 |
| Firefighter ™ pg38*** | 106.7 | 110.8 |

*commercially available, propylene glycol based anti-freeze from Noble Company
**commercially available, 48% glycerin anti-freeze solution from Noble Company
***commercially available, 38% propylene glycol anti-freeze solution from Noble Company Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. It is to be understood that the upper and lower amount, range, and ratio limits set forth herein may be independently combined. While ranges are given for most of the elements of the invention independent of the ranges for other elements, it is anticipated that in more preferred embodiments of the invention, the elements of the invention are to be combined with the various (assorted) desired or preferred ranges for each element of the invention in various combinations. As used herein, the expression "consisting essentially of" permits the inclusion of substances that do not materially affect the basic and novel characteristics of the composition under consideration.

A freezing point depressed aqueous fluid for a fire sprinkler system comprising: a) water, b) at least one $C_2$-$C_{18}$ alkylene glycol (15-65;20-60;25-55), and c) at least one $C_4$ or greater carboxylate (0.01-15;0.1-12;1-10).

The freezing point depressed aqueous fluid for a fire sprinkler system of any previous sentence wherein the water is present at from about 30 to about 80 wt. %.

The freezing point depressed aqueous fluid for a fire sprinkler system of any previous sentence wherein the water is present at from about 35 to about 75 wt. %.

The freezing point depressed aqueous fluid for a fire sprinkler system of any previous sentence wherein the water is present at from about 30 to about 50 wt. %.

The freezing point depressed aqueous fluid for a fire sprinkler system of any previous sentence wherein the water is present at from about 35 to about 45 wt. %.

The freezing point depressed aqueous fluid for a fire sprinkler system of any previous sentence wherein the at least one $C_2$-$C_{18}$ alkylene glycol is present at from about 15 to about 60 wt. %.

The freezing point depressed aqueous fluid for a fire sprinkler system of any previous sentence wherein the at least one $C_2$-$C_{18}$ alkylene glycol is present at from about 15 to about 45 wt. %.

The freezing point depressed aqueous fluid for a fire sprinkler system of any previous sentence wherein the at least one $C_2$-$C_{18}$ alkylene glycol is present at from about 20 to about 42 wt. %.

The freezing point depressed aqueous fluid for a fire sprinkler system of any previous sentence wherein the at least one $C_2$-$C_{18}$ alkylene glycol is present at from about 25 to about 40 wt. %.

The freezing point depressed aqueous fluid for a fire sprinkler system of any previous sentence wherein the at least one $C_4$ or greater carboxylate is present at from about 0.01 to about 15 wt. %.

The freezing point depressed aqueous fluid for a fire sprinkler system of any previous sentence wherein the at least one $C_4$ or greater carboxylate is present at from about 0.05 to about 12 wt. %.

The freezing point depressed aqueous fluid for a fire sprinkler system of any previous sentence wherein the at least one $C_4$ or greater carboxylate is present at from about 0.1 to about 10 wt. %.

The freezing point depressed aqueous fluid for a fire sprinkler system of any previous sentence wherein the at least one $C_4$ or greater carboxylate is present at from about 2 to about 15 wt. %.

The freezing point depressed aqueous fluid for a fire sprinkler system of any previous sentence wherein the at least one $C_4$ or greater carboxylate is present at from about 2.1 to about 15 wt. %.

The freezing point depressed aqueous fluid for a fire sprinkler system of any previous sentence wherein the at least one $C_4$ or greater carboxylate is present at from about 2.1 to about 14 wt. %.

The freezing point depressed aqueous fluid for a fire sprinkler system of any previous sentence wherein the at least one $C_4$ or greater carboxylate is present at from about 2.2 to about 14 wt. %.

The freezing point depressed aqueous fluid for a fire sprinkler system of any previous sentence wherein the at least one $C_4$ or greater carboxylate is present at from about 2.5 to about 12 wt. %.

The freezing point depressed aqueous fluid for a fire sprinkler system of any previous sentence wherein the at least one $C_4$ or greater carboxylate is present at from about 2.75 to about 10 wt. %.

The freezing point depressed aqueous fluid for a fire sprinkler system of any previous sentence wherein the at least one $C_4$ or greater carboxylate is present at from about 3 to about 10 wt. %.

The freezing point depressed aqueous fluid for a fire sprinkler system of any previous sentence wherein the at least one $C_4$ or greater carboxylate is present at from about 3 to about 9 wt. %.

The freezing point depressed aqueous fluid for a fire sprinkler system of any previous sentence wherein the at least one $C_4$ or greater carboxylate is present at from about 3 to about 8 wt. %.

The fluid of any previous sentence, wherein the water is demineralized water.

The fluid of any previous sentence, wherein the $C_2$ to $C_{18}$ alkylene glycol comprises a diol.

The fluid of any previous sentence, wherein the $C_2$ to $C_{18}$ alkylene glycol comprises a triol.

The fluid of any previous sentence, wherein the $C_2$ to $C_{18}$ alkylene glycol comprises a linear alkylene component.

The fluid of any previous sentence, wherein the $C_2$ to $C_{18}$ alkylene glycol comprises a branched alkylene component.

The fluid of any previous sentence, wherein the $C_2$ to $C_{18}$ alkylene glycol comprises a cyclic alkylene component.

The fluid of any previous sentence, wherein the $C_2$ to $C_{18}$ alkylene glycol comprises an aromatic alkylene component.

The fluid of any previous sentence, wherein the $C_2$ to $C_{18}$ alkylene glycol comprises ethylene glycol.

The fluid of any previous sentence, wherein the $C_2$ to $C_{18}$ alkylene glycol comprises propylene glycol.

The fluid of any previous sentence, wherein the $C_2$ to $C_{18}$ alkylene glycol comprises butanediol.

The fluid of any previous sentence, wherein the $C_2$ to $C_{18}$ alkylene glycol comprises bisphenol.

The fluid of any previous sentence, wherein the $C_2$ to $C_{18}$ alkylene glycol comprises resorcinol.

The fluid of any previous sentence, wherein the $C_2$ to $C_{18}$ alkylene glycol comprises glycerin.

The fluid of any previous sentence, wherein the $C_2$ to $C_{18}$ alkylene glycol comprises 1,3-propanediol.

The fluid of any previous sentence, wherein the $C_2$ to $C_{18}$ alkylene glycol comprises a sugar alcohol.

The fluid of any previous sentence, wherein the $C_2$ to $C_{18}$ alkylene glycol comprises sorbitol.

The fluid of any previous sentence, wherein the $C_2$ to $C_{18}$ alkylene glycol comprises mannitol.

The fluid of any previous sentence, wherein the $C_2$ to $C_{18}$ alkylene glycol comprises xylitol.

The fluid of any previous sentence, wherein the $C_2$ to $C_{18}$ alkylene glycol comprises erythritol.

The fluid of any previous sentence, wherein the $C_2$ to $C_{18}$ alkylene glycol comprises pentaerythritol.

The fluid of any previous sentence, wherein the $C_2$ to $C_{18}$ alkylene glycol comprises arabitol.

The fluid of any previous sentence, wherein the $C_2$ to $C_{18}$ alkylene glycol comprises inositol.

The fluid of any previous sentence, wherein the $C_2$ to $C_{18}$ alkylene glycol comprises a glycol ether.

The fluid of any previous sentence, wherein the $C_2$ to $C_{18}$ alkylene glycol comprises from a 70/30 to a 30/70 combination of glycols.

The fluid of any previous sentence, wherein the $C_2$ to $C_{18}$ alkylene glycol comprises a 50/50 combination of glycols.

The fluid of any previous sentence, wherein the $C_2$ to $C_{18}$ alkylene glycol comprises a 60/40 combination of glycols.

The fluid of any previous sentence, wherein the $C_2$ to $C_{18}$ alkylene glycol comprises a 70/30 combination of glycols.

The fluid of any previous sentence, wherein the $C_2$ to $C_{18}$ alkylene glycol comprises propylene glycol and glycerin.

The fluid of any previous sentence, wherein the $C_2$ to $C_{18}$ alkylene glycol comprises ethylene glycol and glycerin.

The fluid of any previous sentence, wherein the $C_2$ to $C_{18}$ alkylene glycol comprises propylene glycol and ethylene glycol.

The fluid of any previous sentence, wherein the $C_4$ or greater carboxylate comprises a Li salt.

The fluid of any previous sentence, wherein the $C_4$ or greater carboxylate comprises a K salt.

The fluid of any previous sentence, wherein the $C_4$ or greater carboxylate comprises an Mg salt.

The fluid of any previous sentence, wherein the $C_4$ or greater carboxylate comprises a Ca salt.

The fluid of any previous sentence, wherein the $C_4$ or greater carboxylate comprises an Na salt.

The fluid of any previous sentence, wherein the $C_4$ or greater carboxylate comprises a hydrate salt.

The fluid of any previous sentence, wherein the $C_4$ or greater carboxylate comprises a mono-valent salt.

The fluid of any previous sentence, wherein the $C_4$ or greater carboxylate comprises a di-valent salt.

The fluid of any previous sentence, wherein the $C_4$ or greater carboxylate comprises a tri-valent salt.

The fluid of any previous sentence, wherein the $C_4$ or greater carboxylate comprises a saturated $C_4$ to $C_{18}$ aliphatic carboxylate.

The fluid of any previous sentence, wherein the $C_4$ or greater carboxylate comprises an unsaturated $C_4$ to $C_{18}$ aliphatic carboxylate.

The fluid of any previous sentence, wherein the $C_4$ or greater carboxylate comprises a saturated $C_4$ to $C_{18}$ aliphatic carboxylate substituted with at least one OH group.

The fluid of any previous sentence, wherein the $C_4$ or greater carboxylate comprises a saturated $C_4$ to $C_{18}$ aliphatic carboxylate having its main chain interrupted by at least one oxygen atom (i.e., $C_4$ or greater carboxylate comprises an oxyacid).

The fluid of any previous sentence, wherein the $C_4$ or greater carboxylate comprises a cyclic carboxylate.

The fluid of any previous sentence, wherein the $C_4$ or greater carboxylate comprises a bicyclic carboxylate.

The fluid of any previous sentence, wherein the $C_4$ or greater carboxylate comprises a $C_4$ to $C_{18}$ metal carboxylate.

The fluid of any previous sentence, wherein the $C_4$ or greater carboxylate comprises a $C_4$ to $C_{16}$ metal carboxylate.

The fluid of any previous sentence, wherein the $C_4$ or greater carboxylate comprises a $C_6$ to $C_{12}$ metal carboxylate.

The fluid of any previous sentence, wherein the $C_4$ or greater carboxylate comprises a mono-carboxylate.

The fluid of any previous sentence, wherein the $C_4$ or greater carboxylate comprises a metal salt of lauric acid.

The fluid of any previous sentence, wherein the $C_4$ or greater carboxylate comprises a metal salt of stearic acid.

The fluid of any previous sentence, wherein the $C_4$ or greater carboxylate comprises a di-carboxylate.

The fluid of any previous sentence, wherein the $C_4$ or greater carboxylate comprises disodium sebacate.

The fluid of any previous sentence, wherein the $C_4$ or greater carboxylate comprises disodium dodecanedioate.

The fluid of any previous sentence, wherein the $C_4$ or greater carboxylate comprises a disodium suberate.

The fluid of any previous sentence, wherein the $C_4$ or greater carboxylate comprises disodium adipate.

The fluid of any previous sentence, wherein the $C_4$ or greater carboxylate comprises a disodium succinate.

The fluid of any previous sentence, wherein the $C_4$ or greater carboxylate comprises disodium azelate.

The fluid of any previous sentence, wherein the $C_4$ or greater carboxylate comprises disodium undecanedioate.

The fluid of any previous sentence, wherein the $C_4$ or greater carboxylate comprises a tri-carboxylate.

The fluid of any previous sentence, wherein the $C_4$ or greater carboxylate comprises a metal salt of citric acid.

The fluid of any previous sentence, wherein the $C_4$ or greater carboxylate comprises tri-sodium citrate.

The fluid of any previous sentence, wherein the $C_4$ or greater carboxylate comprises tri-potassium citrate.

The fluid of any previous sentence, wherein the $C_4$ or greater carboxylate comprises a metal salt of aconitic acid.

The fluid of any previous sentence, further comprising a low carbon number (e.g., $C_1$-$C_3$) carboxylic acid salt.

The fluid of any previous sentence, further comprising a metal salt of formic acid.

The fluid of any previous sentence, further comprising a metal salt of acetic acid.

The fluid of any previous sentence, further comprising a metal salt of propionic acid.

The fluid of any previous sentence, further comprising a metal salt of glycolic acid.

The fluid of any previous sentence, further comprising a metal salt of lactic acid.

The fluid of any previous sentence, wherein the fluid further comprises a corrosion inhibitor.

The fluid of any previous sentence, wherein the fluid further comprises an antioxidant.

A fire sprinkler system containing the fluid of any of any previous sentence.

A fire sprinkler system of any previous sentence containing CPVC components.

A method of preventing a fire sprinkler system from freezing comprising placing in the fire sprinkler system a freezing point depressed aqueous fluid as claimed in any of any previous sentence.

What is claimed is:

1. A freezing point depressed aqueous fluid for a fire sprinkler system comprising:
   a. about 30 to about 80 wt. % water,
   b. about 15 to about 65 wt. % of a combination of at least two C2-C18 alkylene glycols, wherein the combination of the at least two C2-C18 alkylene glycols comprises propylene glycol and glycerin, and
   c. about 2 to about 9 wt. % of at least one of [sebacate,] adipate, succinate, [citrate,] and mixtures thereof.

2. The fluid of claim 1, wherein the water is demineralized water.

3. The fluid of claim 1, wherein the $C_2$ to $C_{18}$ alkylene glycol further comprises ethylene glycol [, propylene glycol, glycerin, or mixtures thereof].

4. The fluid of claim 1, wherein the fluid further comprises a corrosion inhibitor.

5. The fluid of claim 1, wherein the fluid further comprises an antioxidant.

6. A fire sprinkler system containing the fluid of claim 1.

7. A fire sprinkler system of claim 6 containing CPVC components.

8. A method of preventing a fire sprinkler system from freezing comprising placing in the fire sprinkler system a freezing point depressed aqueous fluid as claimed in claim 1.

* * * * *